(12) United States Patent
Perng et al.

(10) Patent No.: US 7,447,723 B2
(45) Date of Patent: Nov. 4, 2008

(54) METHOD FOR FAST RELEVANCE DISCOVERY IN TIME SERIES

(75) Inventors: Chang-Shing Perng, Goldens Bridge, NY (US); Haixun Wang, Irvington, NY (US)

(73) Assignee: International Business Machine Corporation, Armonk, NY (US)

( * ) Notice: Subject to any disclaimer, the term of this patent is extended or adjusted under 35 U.S.C. 154(b) by 23 days.

(21) Appl. No.: 11/563,900

(22) Filed: Nov. 28, 2006

(65) Prior Publication Data

US 2008/0177813 A1    Jul. 24, 2008

(51) Int. Cl.
G06F 17/15    (2006.01)
(52) U.S. Cl. ..................................................... 708/422
(58) Field of Classification Search ......... 708/422–426, 708/200–209, 490
See application file for complete search history.

(56) References Cited

U.S. PATENT DOCUMENTS 4,734,909 A * 3/1988 Bennett et al. .............. 370/462
5,893,058 A * 4/1999 Kosaka ........................ 704/254
7,117,108 B2 * 10/2006 Rapp et al. .................... 702/71

* cited by examiner

Primary Examiner—Chat C Do
(74) Attorney, Agent, or Firm—Cantor Colburn LLP; Cynthia Byrd

(57) ABSTRACT

A method for measuring time series relevance using state transition points, including inputting time series data and relevance threshold data. Then convert all time series values to ranks within [0,1] interval. Calculate the valid range of the transition point in [0,1]. Afterwards, a verification occurs that a time series Z exists for each pair of time series Z and Y, such that the relevances between X and Z, and between Y and Z are known. Then deduce the relevance of X and Y. The relevance of X and Y must be at least one of, (i) higher, and (ii) lower than, the given threshold. Provided Z is found terminate all remaining calculations for X and Y. Otherwise, segment the time series if no Z time series exists, use the segmented time series to estimate the relevance. Apply a hill climbing algorithm in the valid range to find the true relevance.

3 Claims, 8 Drawing Sheets

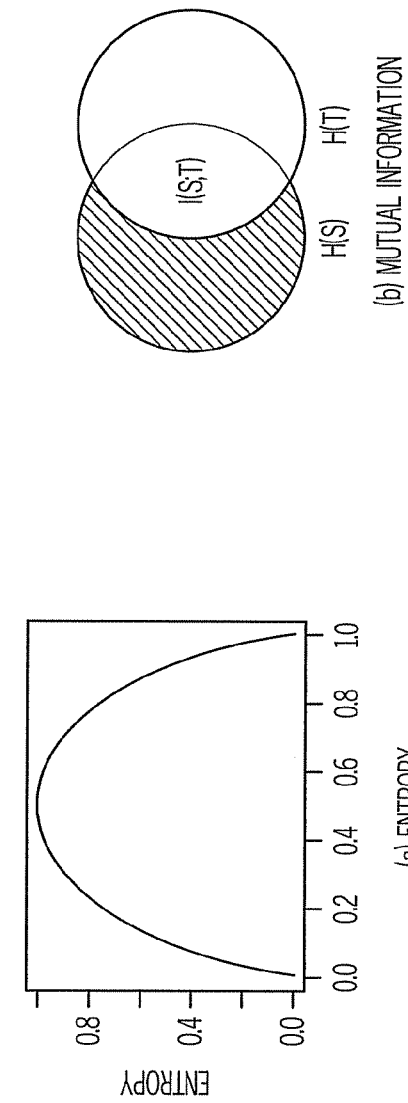
FIG. 3
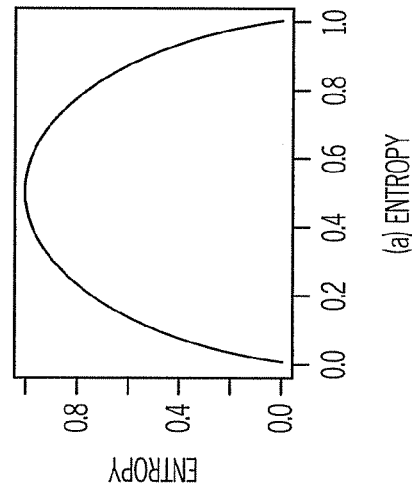
FIG. 4A
FIG. 4B

METHOD FOR FAST RELEVANCE DISCOVERY IN TIME SERIES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of Invention

This invention relates in general to systems, and more particularly to monitoring multiple time series as a measurement of system behavior.

2. Description of Background

Large volumes of time series data are routinely generated in scientific, engineering, financial, and medical domains. A wide spectrum of applications monitor time series data for process and quality control, pattern discovery, and abnormality forecasting. Much study has focused on revealing the internal structure (e.g., autocorrelation, trends and seasonal variation) of time series, and recently, mining time series for knowledge discovery has received a lot of attention from data mining, information retrieval, and bioinformatics communities.

Examples of monitoring a large number of times series streams includes data collected by distributed sensors, real time quotes of thousands of securities, system events generated by a large number of networked hosts, and DNA expression levels gathered by the microarray technology for thousands of genes, etc.

One of the common tasks in monitoring multiple time series simultaneously is to find correlations among them. Discovering correlations is important to many applications for at least two reasons. First, fluctuation of values in one time series often depends on many factors. Separate analyses on single series are not sufficient to understand the underlying mechanism that produces the multiple interrelated time series. Second, monitoring tens of thousands of time series is a resource intensive task. Knowing the interrelationship among the time series may enable us to concentrate limited resources on as few time series as possible, as the behavior of other time series can be derived by these time series.

Thus, there is a need for a method that measures the relevance of multiple time series by leveraging state transition points and mutual information maximization.

SUMMARY OF THE INVENTION

The shortcomings of the prior art are overcome and additional advantages are provided through the provision of a method for measuring time series relevance using state transition points including inputting time series data and relevance threshold data. The method further includes converting all time series value to ranks within [0,1] interval. Afterwards the method proceeds by calculating the valid range of the transition point in [0,1]. Then the method includes verifying that a time series Z exists for each pair of time series Z and Y, such that the relevances between X and Z, and between Y and Z are known. The method further includes deducing the relevance of X and Y. The relevance of X and Y must be at least one of, (i) higher than the given threshold, and (ii) lower than the given threshold. The method proceeds by terminating all remaining calculations for X and Y provided Z is found. Next, the method proceeds by segmenting time series if no Z time series exists and using the segmented time series to estimate the relevance. Then the method includes applying a hill climbing algorithm in the valid range to find the true relevance.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for a method for measuring time series relevance using state transition points.

BRIEF DESCRIPTION OF THE DRAWINGS

The subject regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 illustrates an example of a table containing the notations utilized in this application;

FIGS. 4(a)-(b) illustrate an example of a relationship between bifurcating points, entropy and mutual information;

The detailed description explains an exemplary embodiment of the invention, together with advantages and features, by way of example with reference to the drawings.

DETAILED DESCRIPTION OF THE INVENTION

The typical configuration of a medium-to-large enterprise production system usually comprises a few thousand hosts and provides hundreds of different services such as cataloging, website search, shopping cart management, credit card authentication, check out, etc.

Figure 1:
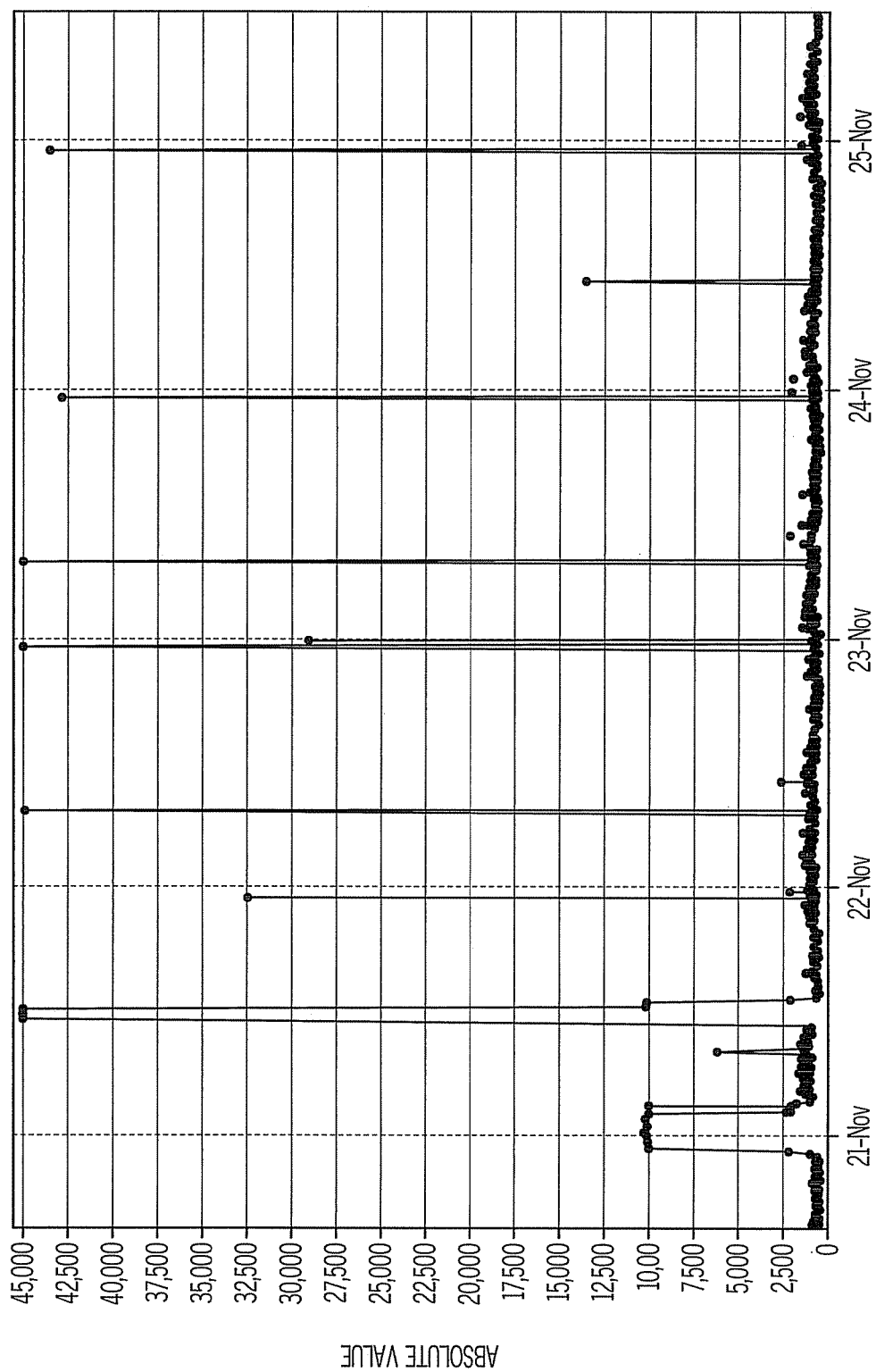
FIG. 1 illustrates an example of a typical web-service response time.

Systems are monitored internally as well as externally. Externally, on the client side, end-to-end probing measures the availability and the response time of each service by sending dummy requests to the server. FIG. 1, shows a typical example of web-service response time.

Internally, the entire information infrastructure can be closely monitored in every aspect. For instance, we monitor available system resources, including CPU, physical memory, free disk space, network bandwidth, etc. A system resource is often monitored using many types of metrics. For example, CPU usages are usually measured in system time, user time, process time and idle time. Important service providers, such as web servers, database servers, e-mail servers, directory servers, DHCP servers, storage servers, and multimedia servers, are intensively monitored as well.

The large amount of information generated during monitoring often exceeds our processing capability. A common approach is to aggregate data by time-based windows and use aggregated data for analysis. The aggregated data is still huge. Case studies show that typically, there are hundreds of end-to-end probing metrics and around a million resource monitoring metrics.

The sheer number and size of time series can make even the simplest analysis nontrivial to realize. Effective monitoring of tens of thousands of times series depends on whether the following critical tasks are satisfactorily performed.

Elimination of Redundant Metrics: It is very expensive to monitor, archive and interpret a huge number of metrics. Fortunately, due to the interrelationship among the time series, many metrics are redundant. That is, the values of one metric can be inferred by other metrics. Eliminating these metrics from the monitoring list can reduce cost without incurring information loss.

Discover of Critical Resources: Case studies show that the sheer complexity of a medium-sized business system can make the dependency relationship between services and resources incomprehensible. It is highly valuable to identify the critical resources for the purpose of capacity planning.

Tuning of Monitoring Thresholds: Based on the principle of exception management, system administrations can only afford attention to anomalies defined by threshold violations. Improper threshold settings may lead to the generation of too many or too few alerts.

Clearly, discovering meaningful interrelationships of multiple metrics is essential to each of these critical tasks. However, traditional correlation measurements such as Pearson's coefficients are not equal to this task. The disclosed invention is directed at accomplishing these tasks by using a new relevance model and an efficient algorithm.

Finding highly correlated time series is important to many applications. Currently, there is no intuitive model nor robust computation methods for this task. The disclosed invention proposes:

Modeling time series by state transition points. Intuitively, when values of a time series cross these points, they may trigger significant changes in related time series. This indicates that aspects of system behavior may not be related by linear constraints that traditional correlation measurements such as Pearson's coefficients try to capture, but rather, by unknown, intrinsic state changes.

A relevance model is proposed based on the concept of state transition points. Relevance is measured through mutual information maximization. It is an elegant measure that captures interrelated time series effectively.

An efficient algorithm is proposed to identify state transition points, and to find highly correlated time series. Efficiency of the algorithm is achieved by leveraging triangular inequalities of entropy and mutual information.

As a byproduct, the state transition points identified are very helpful for understanding and fine tuning the system.

A new model is introduced to measure correlation between a pair of time series. Through real life examples in system management, it is shown that traditional methods are not effective in capturing important correlations. Then a new measure is proposed based on state transition points, which are an essential concept in describing a complicated system.

Pearson's correlation is often used to measure association between a pair of time series. However, it is only meaningful for quantifying the strength of linear correlations, and in situations where data contains outliers or missing values, Pearson's correlation coefficient may cease to be meaningful.

For example, in FIG. 1, the response time obtained through end-to-end probing of some web service is shown. FIG. 1, is a good indication that time series data often contains dramatic values. However, in this case, there is a good explanation for the dramatic values. In end-to-end probing, we usually use a large value (e.g. 10000 ms) to denote time-out, i.e., no response is received within a certain time period (e.g., 1000 ms). Although the time-out values do not represent the real response time and using these values will skew the average response time upward, they cannot be discarded because that will skew the average response time downward. In other words, they are outliers that cannot afford to be discarded.

Figure 2A:
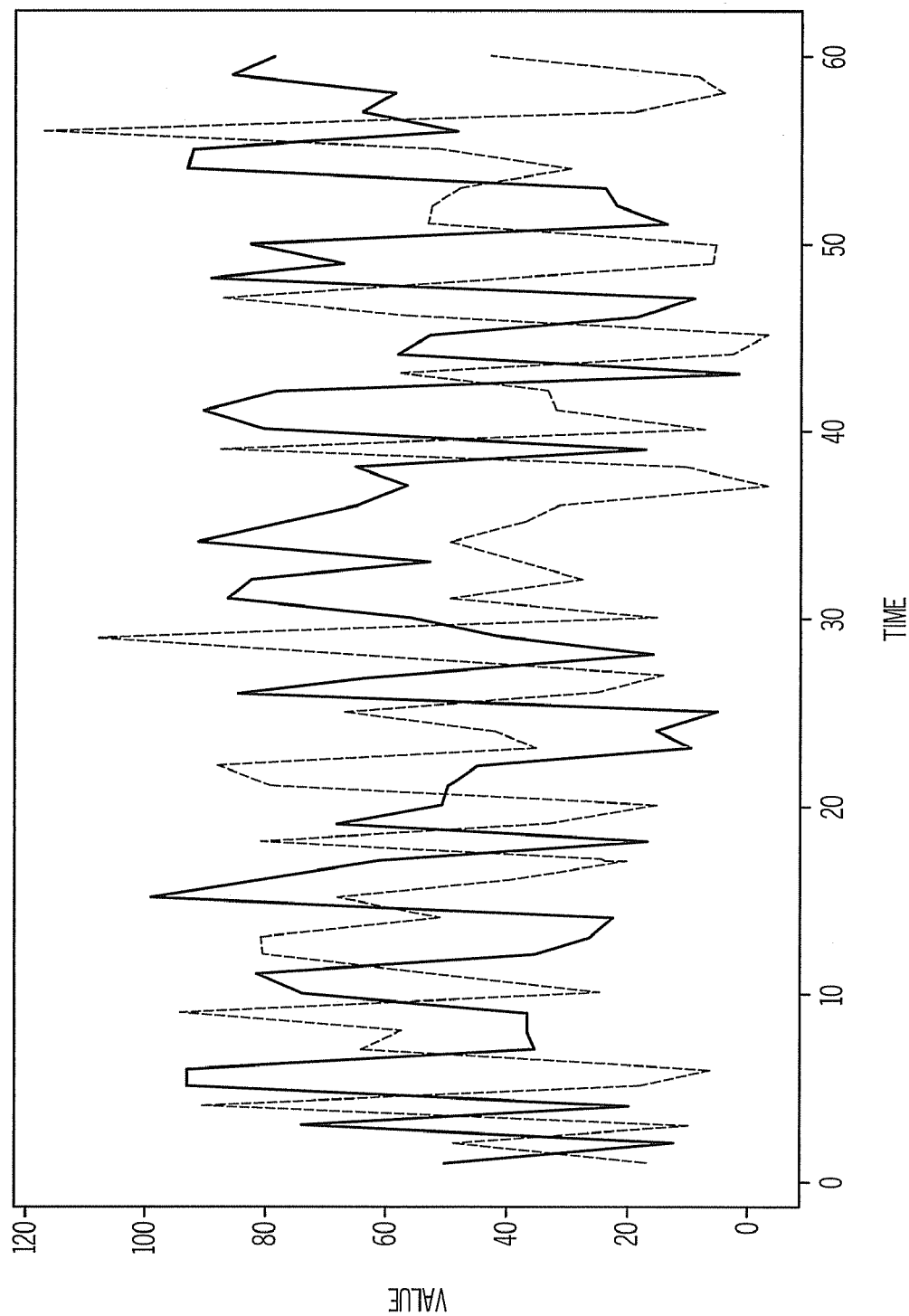
FIGS. 2(a)-2(b) illustrate an example of two different plots of time series.

Even in data free of outliers and missing values, Pearson's coefficient may not be able to capture every meaningful correlation. In FIG. 2(a), two time series are shown which do not visually exhibit any strong correlation. In fact, their Pearson's correlation coefficient is −0.49, which is not particularly high and seems to confirm the lack of correlation. However, if the two time series are plotted in an X-Y plot as in FIG. 2(b), then it is shown that the data points only appear in the north-west and south-east region, with very few exceptions. This is a strong correlation, and it has a significant underlying meaning.

Figure 2B:
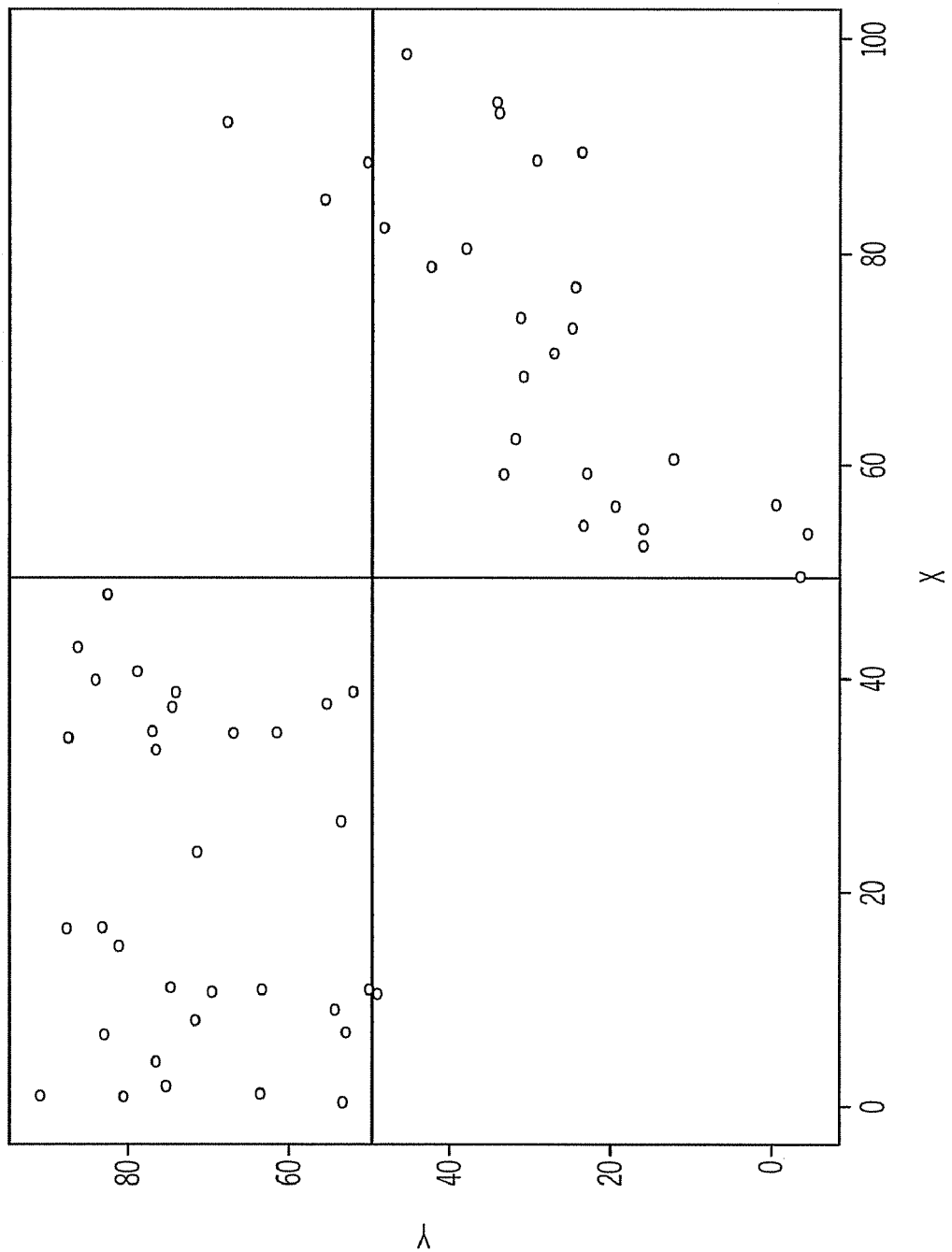

The phenomena in FIG. 2, carries significant meanings. Take computer systems as an example. Memory usage in a system fluctuates according to system load. When total memory usage is below the physical memory size, running applications may experience little performance difference. However, when it exceeds the size of physical memory and the system starts to use disk cache, applications may experience significant slowdown suddenly. Similarly, when CPU usage reaches its maximum capacity, no more CPU cycles can be assigned to one process without affecting other processes, which may suddenly slow down all applications across the board. The same phenomenon can also be observed in monitoring available network bandwidth, thread counts, number of opened file handles, queue length, and almost all other system resources. FIG. 2(b) is just an example of the phenomena.

From the phenomena discussed the following observation arises. A certain threshold may determine correlation between two time series. In regions away from the threshold, correlation is weak and insignificant. However, when one time series crosses the threshold, the other time series responds dramatically.

Intuitively, to capture the correlation, the time series can be discretized into binary sequences at the threshold point. That is, any above this threshold will be encoded by 1, and any point below encoded by 0. Note that threshold points are determined by the intrinsic mechanism of the system, and are different in different time series.

A discretization method shall be introduced based on the above intuition, and used to develop a correlation model for discretized time series. The notations utilized in this application are summarized in the table shown in FIG. 3.

One objective is to find the best threshold to discretize a time series into a binary sequence. Clearly, exact values in the time series are not important; what matters are the relative values to the threshold.

The original time series undergoes a preprocess to convert exact values into percentiles (or ranks). This makes further computation and discussion easier, and it also eliminates outliers in the time series.

The resulting percentile time series are composed of points in the range of [0,1], and the next task is to find a threshold $\kappa \in [0,1]$ to bifurcate time series into binary strings. Throughout the remainder of this application, time series is used to mean percentile time series.

Intuitively, think of a system as having a set of states, which form a state space. At any point of time, the system is in one of the states in the state space. Imagine there are points (or hyper-planes) in the state space that divide the space into regions where the system behaves very differently. Then, once the state passes these state transition points into different regions, there will be non-continuous change in system behavior.

When the system is experiencing non-continuous changes, such changes will reflect in the time series that monitors the system. In other words, there may exist a threshold within the [0,1] range of time series that corresponds to such changes.

Another objective is to discretize time series at such thresholds and study their correlation on discretized time series. In the following, bifurcation functions are defined to discretize real valued time series into binary sequences.

Definition 1 Given a threshold $\kappa \in [0,1]$ and a time series $T = \langle B_\theta(t_1), \ldots, B_\theta(t_n) \rangle$ where $$B_\theta(x) = \{T \text{ if } x \geq \theta, \perp \text{ if } x < \theta\}$$

The resulting time series is called bifurcated time series because it is discretized at point $\theta$ into binary representation. The threshold $\theta$ is as the bifurcating point.

If the right bifurcating points are chosen, two bifurcated times series may exhibit high correlation. Let $\theta_x$ and $\theta_y$ be the thresholds chosen for time series X and Y. The bifurcating point divide X's range of [0,1] into a low regision $[0,\theta_x)$ and a high region $[\theta_x,1]$, and $\theta_y$ does the same thing for Y. The two time series X and Y are relevant if $(X_i, Y_i)$ largely fall into diagonal regions. That is, i) either $X_i$ and $Y_i$ tend to be in the same high or low region, ii) or, they tend to be in opposite regions, that is, when $X_i$ is in the high regions of X, $Y_i$ is in the low region of Y, and vice versa.

FIG. 2(b) is an example that corresponds to the second case above. The two time series plotted in FIG. 2(b) are strongly correlated as the points largely fall into the diagonal regions.

Given two time series S and T, the correlation between S and T is defined as:

$$C(S,T) = \max_{\theta_s, \theta_t} \{I(S_{\theta_s}; T_{\theta_t})\}$$

Where $S_{\theta_s}$ and $T_{\theta_t}$ are the bifurcated time series based on bifurcation points $\theta_s$ and $\theta_y$, and I (X;Y) is the mutual information between X and Y.

Based on the previous description, it may be concluded that two time series S and T are more relevant if they share larger diagonal regions. However, the regions are defined by the thresholds $\theta_s$ and $\theta_t$. If the threshold is set at the high or the low extremes (1 or 0), than all of the points will be in the same region, and consequently, any two times series will be highly correlated according to the above criteria.

In other words, in order to make the relevance measure meaningful, at the same time when trying to maximize diagonal regions shared by the two time series, thresholds that divide the value range into more even regions are favored.

Mutual information is a statistic that can be used for this purpose. FIG. 4, illustrates the relationship between bifurcating point, entropy and mutual information. The definition of entropy is given as: Definition 2 Let $T_\theta = \langle s_1 \ldots s_n \rangle$ be a bifurcated time series, its entropy is defined as $$H(T_\theta) = -\sum_{x \in \{T, \perp\}} p(x) \log p(x)$$

Note that all logarithm used here are 2-based so the maximum value of entropy is 1, as shown in FIG. 4(a).

Problem 1 (Relevance Discovery) Let S and T be two time series. Find bifurcating points $\theta_s$ and $\theta_t$ that maximize mutual information $I(S_{\theta_s}, T_{\theta_t})$.

The above definition requires that the optimal thresholds for both of the time series at the same times be found. In some applications, the bifurcating point, or the threshold of one of the time series is given, and then it is only required to find the optimal threshold of the other time series. For example, the breach points (thresholds) of service metrics are obtained by breach point sensitivity analysis. So only the thresholds of resource metrics are changeable. This variation is a strictly simpler problem of the problem stated above.

Problem 2 (Highly correlated Pairs) Given multiple time series and a threshold $\mu$, find any pair S and T whose correlation, or maximum mutual information $I(S_{\theta_s}, T_{\theta_t})$ is above $\mu$.

To compute the correlation of two time series, w must first identify the bifurcating points that maximize the mutual information. If time series are of length m, this process has complexity $O(m^2)$. Then, to find pair-wise relevance for n time series of length m using a naïve, brute-force algorithm requires $O(n^2 m^2)$ time. This section proposes methods to improve performance by identifying lowly correlated pairs and filter them out as early as possible.

In summary, the algorithm adopts the following strategies:
1. Establish a valid range inside [0,1] for the bifurcating points. We will show that if bifurcating points are outside the range, the correlation cannot be above the user threshold $\mu$.
2. Avoid pair-wise calculation whenever possible.
3. Avoid scanning every point in time series whenever possible.
4. Avoid survey all possible threshold values.

Algorithm 1 is the main procedure for finding highly correlated pairs $(T_i, T_j)$ in a set of time series T. The algorithm returns $R(T_i, T_j)$, the correlation between any pair $T_i$ and $T_j$.

| Algorithm 1 Main algorithm |
| --- |
| 1: procedure MAIN(T, $\mu$) |
| 2:     $\rho \leftarrow H^{-1}(\mu)$ |
| 3:     for every pair $(T_i, T_j)$ of T do |
| 4:         if Triangular_bound($T_i, T_j$) $\leq \mu$ then |
| 5:             $R(T_i, T_j) \leftarrow -1$ |
| 6:         else if Seg_estimate($T_i, T_j, \rho$) $\leq \mu$ then |
| 7:             $R(T_i, T_j) \leftarrow -1$ |
| 8:         else |
| 9:             $R(T_i, T_j) \leftarrow$ Nelder-Mead($T_i, T_j$) |
| 10:        end if |
| 11:    end for |
| 12:    return R |
| 13: end procedure |

By using algorithm 1, first the valid bifurcating range is determined, which is represented by $\rho$ (line 2). Then, for any pair $T_i$ and $T_j$, check if their correlation is below μ by using two methods, triangular inequality bound, and the segmentation method. If neither method is successful in eliminating the pair, we invoke the Nelder-Mead method to approximate the correlation.

The preliminary focus is on finding pairs of time series whose mutual information is above a minimal threshold μ. For two random variables X and Y, their mutual information is defined as:

$$I(X;Y)=H(X)-H(X|Y)$$

where H(X) is the entropy of X. Since entropy is non-negative, we have $I(X;Y) \leq H(X)$. Thus, in order for a bifurcated time series X to form a highly correlated (correlation≧μ) pair with another times series, its entropy H(X) must be above μ. This result can be used to prune time series.

In other words, the choice of the bifurcating points must yield enough entropy so that the mutual information can be possibly above the minimal threshold. It is not difficult to derive, given the minimal threshold μ, the bifurcating points must be inside the following range.

$$[H^{-1}(\mu), 1-H^{-1}(\mu)] \quad (1)$$

For example, if μ is 0.7, bifurcating points must reside in the range of [0.189,0.811].

It is expensive to compute the exact correlation of two time series as it requires multiple scans of the data. Using a feature vector to represent each time series, and estimate pair-wise mutual information using feature vectors. If the estimation falls below μ with large probability, then there is no need to actually compute the precise mutual information.

The intuition of the segmentation and estimation method comes from the locality of time series values. Time series is cut into a few segments. Because of locality, values in a segment may fall inside a small range. Then the ranges can be used to approximate the original time series.

According to Equation 1, valid bifurcating points are inside a range determined by user threshold μ. Denote the range by [x,y], where $0 \leq x < y \leq 1$. Given a time series T, no matter what bifurcating point is chosen inside [x,y], values less than x will always be discretized as ⊥, and values above y will always be discretized as ⊤. We call values inside range [0,x] surely negative, and values inside range (y,1] surely positive.

Partition a time series T into m segments, $T_1, \ldots, T_m$. The segments do not need to be equal in size. T is represented by two feature vectors:

$$C^{\top,33}(T) = \langle sp(T_1), \ldots, sp(T_m) \rangle$$

$$C^{\perp}(T) = \langle sn(T_1), \ldots, sn(T_m) \rangle$$

where $sp(T_i)$ and $sn(T_i)$ are the number of points in $T_i$ that are surely positive and surely negative respectively.

Each segment may contain points that are neither surely positive nor surely negative. The number of such points is $|T_i|-sp(T_i)-sn(T_i)$. Whether such a point is discretized to ⊤ or ⊥ will be determined by the bifurcating point chosen. Let $L_\top(T_k)$ denote the number of positive points in segment $T_k$, and let $L_\perp(T_k)$ denote the number of negative points in segment $T_k$. Estimate $L_\top(T_k)$ and $L_\perp(T_k)$ as follows:

$$\widehat{L_\top(T_k)} = sp(T_k) + \frac{sp(T_k)}{|T_k|}(|T_k|-p(T_k)-n(T_k))$$

-continued $$\widehat{L_\perp(T_k)} = sn(T_k) + \frac{sn(T_k)}{|T_k|}(|T_k|-p(T_k)-n(T_k))$$

Intuitively, the estimation assumes that the number of positive points in a segment is proportional to the number of surely positive points in that segment, and same for the number of negative points. This is a reasonable assumption as points in a time series often exhibit locality.

Based on the estimation of the number of positive and negative points in each segment, to derive the probability distribution in the entire time series use:

$$P(T^\top) = \sum_k \frac{\widehat{L_\top(T_k)}}{|T|}$$

$$P(T^\perp) = 1 - P(T^\top)$$

However, to compute entropy and mutual information, the joint distribution of two time series must be known. For instance, we need to know $P(S_\top,T_\top)$ and $P(S^\perp,T^\perp)$, that is, whether the points in S and T are aligned in such a way that positive points in S always appear together with positive points in T.

Because computing joint distribution is expensive, we use the distribution of single time series to estimate the joint distribution. As previously mentioned, when the entropy of each time series is fixed, the maximum correlation occurs when the diagonal region is maximized. That is, either positive points of S tend to appear together with positive points of T, or tend to appear with negative points of T.

Since $C_\top(T)$ and $C^\perp(T)$ have been computed for each time series T, they can be used to estimate the joint probabilities of S and T:

$$P(S^\top, T^\top) = \sum_{1 \leq i \leq m} \frac{\max(\widehat{L_\top(S_i)}, \widehat{L_\top(T_i)})}{\|S\|} \quad (2)$$

$$P(S^\perp, T^\perp) = \sum_{1 \leq i \leq m} \frac{\max(\widehat{L_\perp(S_i)}, \widehat{L_\perp(T_i)})}{\|S\|} \quad (3)$$

Clearly, the value of $P(S_\top,T_\top)$ computed above is a maximum estimation, as it occurs only if all positive points are aligned. Same is true for $P(S^\perp,T^\perp)$.

To maximize the diagonal region, alternatively maximize $P(S_\top,T^\perp)$ and $P(S^\perp,T_\top)$ in a similar way:

$$P(S^\top, T^\perp) = \sum_{1 \leq i \leq m} \frac{\max(\widehat{L_\top(S_i)}, \widehat{L_\perp(T_i)})}{\|S\|} \quad (4)$$

$$P(S^\perp, T^\top) = \sum_{1 \leq i \leq m} \frac{\max(\widehat{L_\perp(S_i)}, \widehat{L_\top(T_i)})}{\|S\|} \quad (5)$$

Use Equation (2,3) and Equation (4,5) to compute the mutual information, and choose the bigger one as our final estimation.

Figure 5:
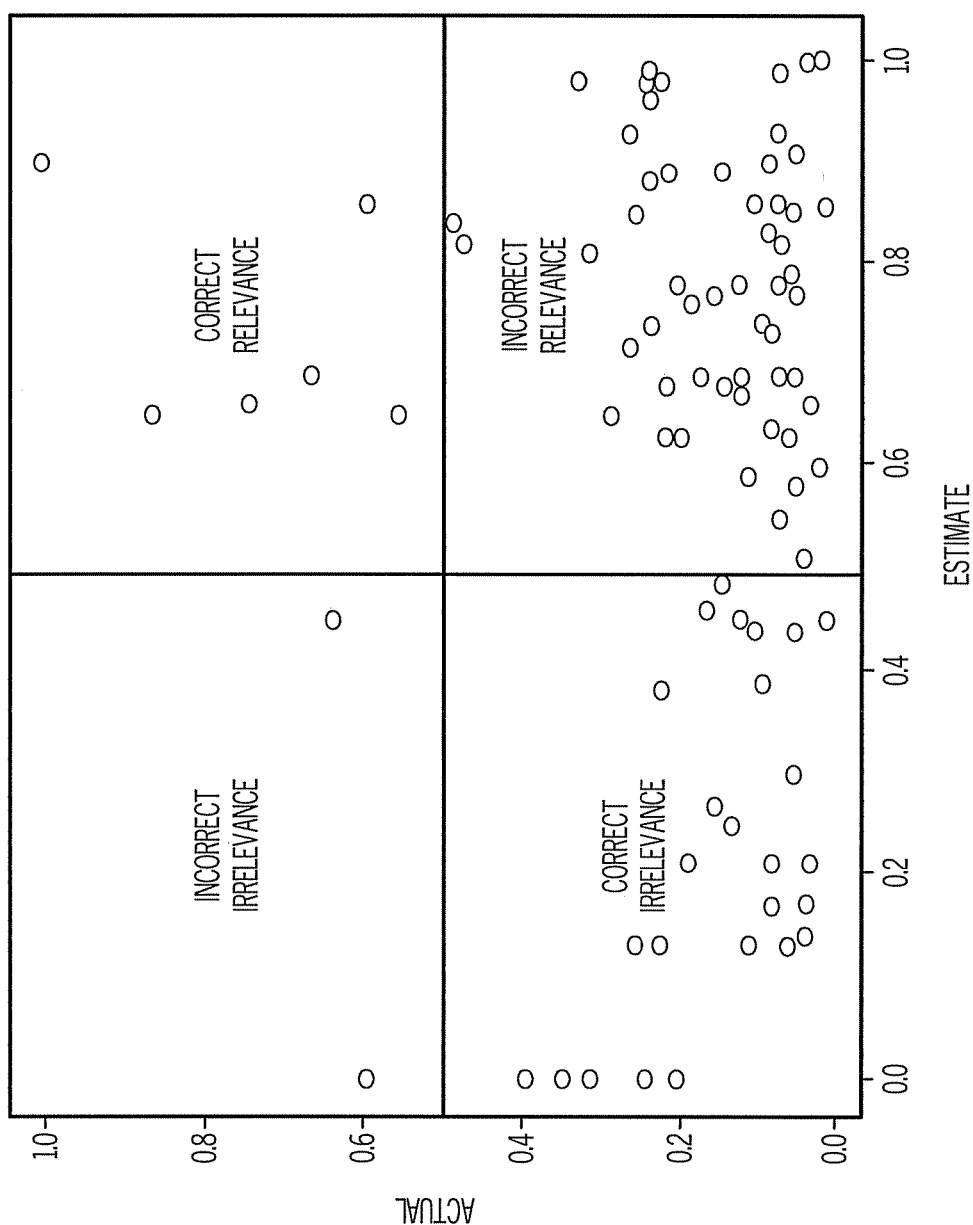
FIG. 5 illustrates an example of an estimation accuracy with $\mu=0.3$ and 10-way segmentation.

Empirical studies were conducted on the estimation method. FIG. 5 shows a typical relation between estimated and actual relevance. Using 0.5 as threshold for both estimated and actual relevance, it can be seen that generally the estimated relevance is higher than the actual ones. This is because Equation (2,3,4,5) the alignment is always maximized. As further methods will be used to find the actual relevance for pairs that are estimated relevant, the only loss is those points that fall into the incorrect irrelevance region. Fortunately, very few points (less than 3% in this study) fall into that region. About a quarter of the points fall into the correct irrelevance region, these are the pairs eliminated with no further computation.

Figure 6:
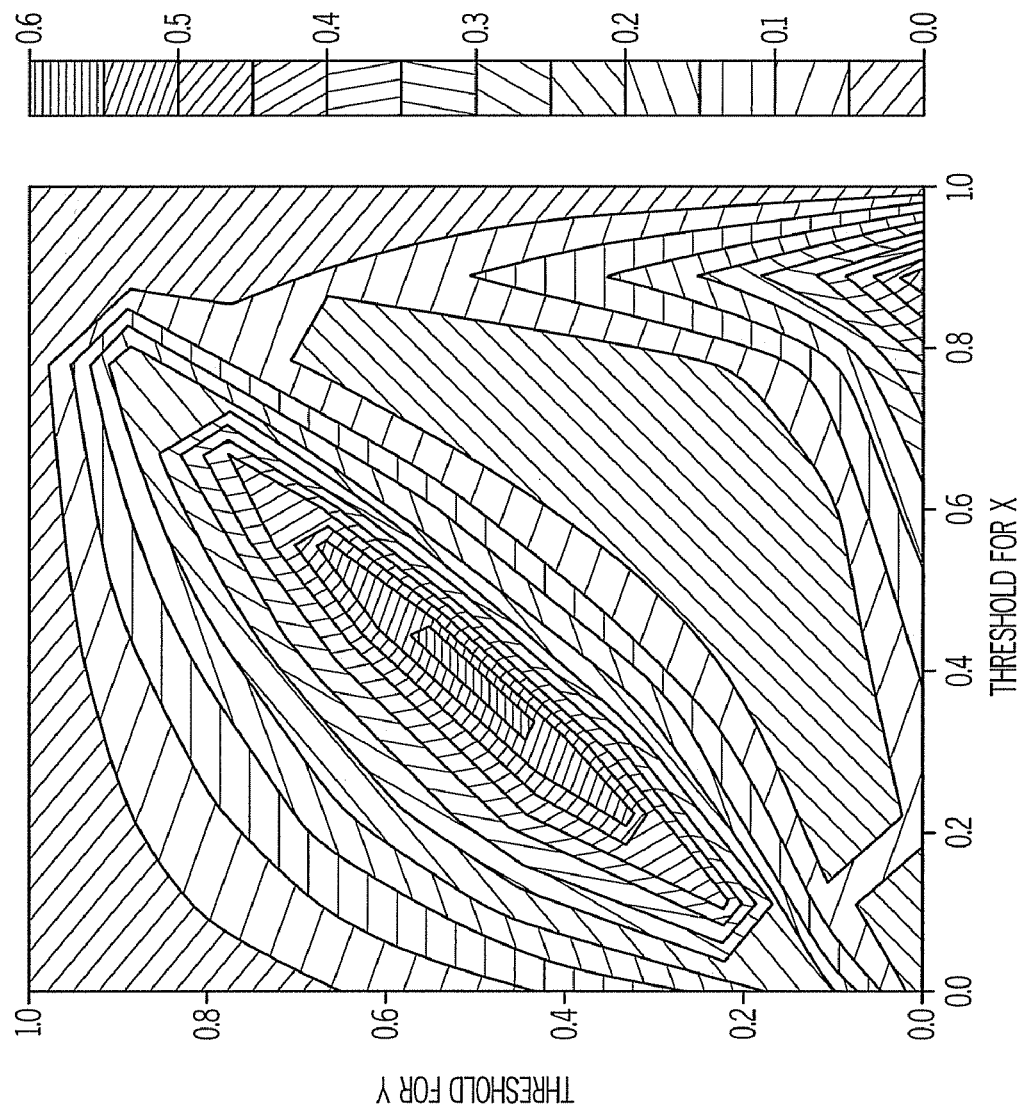
FIG. 6 illustrates an example of a contour plot of mutual information.

If the estimated relevance of two time series is above µ, then an expensive search must be performed to find the optimum points. A brute-force method is to use grid-point survey of the I(S,T) surface. FIG. 6 shows a typical example.

Observe the following:
1. The surface is relatively smooth.
2. The number of maxima is small.

Finding the maxima in functions of several variables is a classical optimization problem. Two methods were compared: the gradient method and the Nelder-Mead Simplex method.

The Nelder-Mead Simplex Method is a widely used classical function optimization algorithm. While gradient methods have to compute function values in a very small region during each iteration in order to simulate the first and second directives, this method starts from a set of points distributed in a rather bigger area. There are three operations that can be performed in each iteration-reflection, contraction and expansion.

Figure 7:
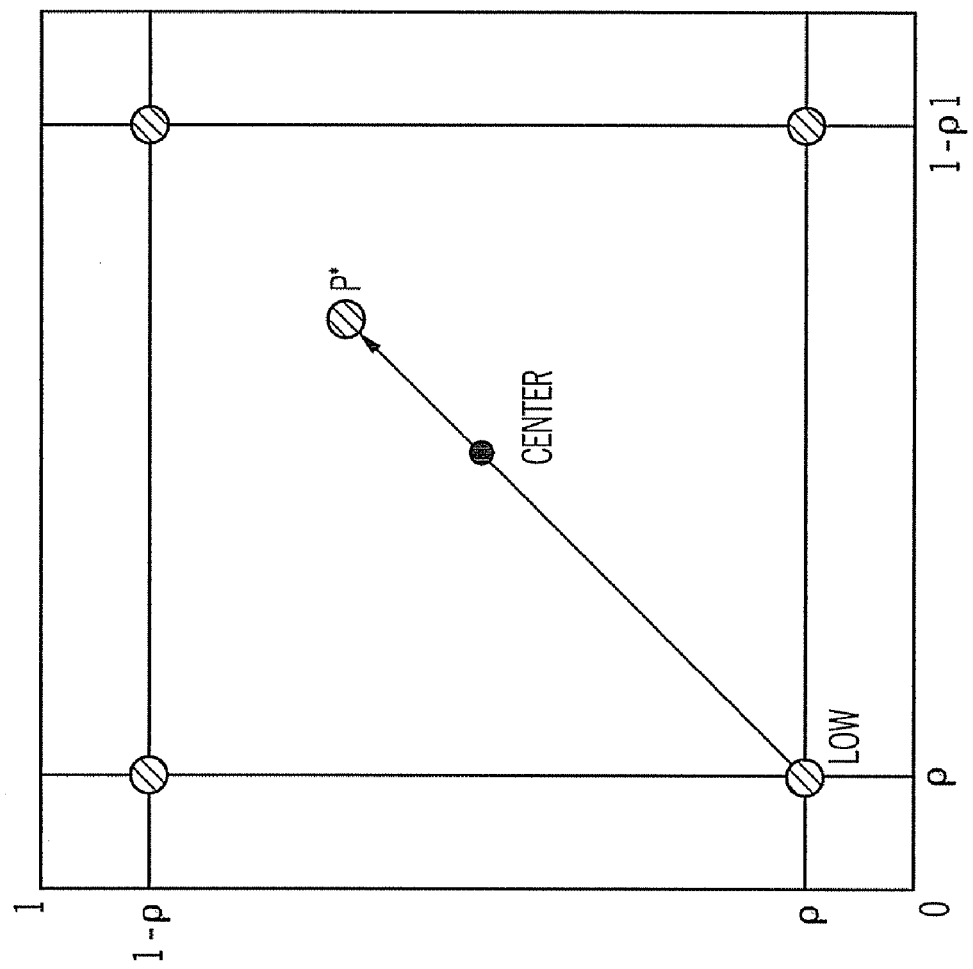
FIG. 7 illustrates an example of an initial set of Nelder-Mead Simplex points.

The original algorithm was adapted on the following aspects:
1. A point to be visited has to lie inside the feasible region in which the entropy exceed µ.
2. Instead of the usual 3-point convex shape, we use 4-point convex with the initial set $\{(\rho,\rho),(1-\rho,\rho),(1-\rho,1-\rho)\}$ as shown in FIG. 7 for two reasons: 1) The highest initial center point is (1/2,1/2), the points with the highest entropy for both time series and likely to yield high mutual information. 2) The additional cost of calculating more points in the same number of data scans is very marginal.

The experiments conducted show this algorithm converges in our problem. Finding all highly correlated pairs is an expensive process. Various methods are proposed to reduce computation cost by using previously computed pairwise results.

The key is to develop triangular inequalities to estimate the pair-wise relevance between X and Y by studying their relationships with a third variable Z. The problem is addressed in two steps. First, derive general triangular information inequality. Then, extend the results to the case of bifurcated time series.

Using the correlation we have computed between X and Z and between Y and Z, we would like to infer the relevance between X and Y. We start with a lemma that is the foundation of the following theorems.

Lemma 1 The following inequalities hold $$H(X|Y) \leq H(X|Z) + H(Z|Y). \quad\quad 1.$$

$$H(X|Y) \geq I(X;Z) - H(Z|Y). \quad\quad 2.$$

Applying the above inequality to mutual information I(X;Y)=H(X)−H(X|Y), we obtain the upper bound and the lower bound for I(X,Y) as shown below.

Theorem 1 The mutual information I(X;Y) have the following bounds.

1. Lowerbound: (6)

$$I(X;Y) \geq \max(I(X;Z) - H(Z|Y), I(Y;Z) - H(Z|X))$$

2. Upperbound: (7)

$$I(X;Y) \leq \min(I(Z;Y) + H(X|Z), I(X;Z) + H(Y|Z)).$$

Theorem 1 enables the estimation of the range of I(X;Y) through two pairwise information relationships between X and Z and between Y and Z. As a result, without computing the exact value of I(X;Y), if the lower bound is above the relevance threshold. It can be concluded that X and Y are significantly relevant; likewise, if its upper bound is below the relevance threshold, it can be concluded that X and Y are not significantly relevant.

The triangular inequality was extended to handle bifurcated time series produced by different bifurcating points. Notice that for any two given bifurcating points $\theta_1$ and $\theta_2$ on a time series X, we can easily compute the information relationship between $X_{\theta_1}$ and $X_{\theta_2}$ using the following theorem.

Theorem 2 Assume $\theta_1 \leq \theta_2$, then the following equalities hold:

1. $H(S_{\theta_1}|S_{\theta_2}) = -\theta_1 \log\frac{\theta_1}{\theta_2} - (\theta_2 - \theta_1)\log\frac{\theta_2 - \theta_1}{\theta_2}.$ 2. $H(S_{\theta_2}|S_{\theta_1}) = -(\theta_2 - \theta_1)\log\frac{\theta_2 - \theta_1}{1-\theta_1} - (1-\theta_2)\log\frac{1-\theta_2}{1-\theta_1}.$ To compute the triangle inequality on time series generated by different bifurcating points, introduce some notations. Let $\theta_{xz}, \theta_{zy},$ and $\theta_{yx}$ represent the optimal threshold sets that maximize the mutual information of (X,Z), (Z,Y) and (Y,X), respectively. Note that θ is overloaded here to refer to a pair of optimal bifurcating points. For example, $\theta_{xz}$ refers to the two thresholds on X and Z that together optimize the mutual information of X and Z. With the three sets of thresholds, we obtain six binary random variables:

$$X_{\theta_{xz}}, Z_{\theta_{xz}}, Z_{\theta_{zy}}, Y_{\theta_{zy}}, Y_{\theta_{yx}}, \text{ and } X_{\theta_{yx}}$$

Theorem 3 The mutual information of $I(X_{\theta_{xy}}, Y_{\theta_{yx}})$ is bounded from below as:

$$I(X_{\theta_{yx}}, Y_{\theta_{yx}}) \geq \max(I'_{\theta_{zy}}, I'_{\theta_{xz}}),$$

where $$I'_{\theta_{xz}} = I(X_{\theta_{xz}}, Z_{\theta_{xz}}) - H(Z_{\theta_{zy}}|Y_{\theta_{xz}})$$

$$-(H(Z_{\theta_{xz}}|Z_{\theta_{zy}}) + H(Y_{\theta_{zy}}|Y_{\theta_{yx}}) + H(X_{\theta_{xz}}|X_{\theta_{yx}}))$$

$$I'_{\theta_{zy}} = I(Z_{\theta_{zy}}, Y_{\theta_{xy}}) - H(Z_{\theta_{xz}}|Y_{\theta_{xz}})$$

$$-(H(Z_{\theta_{zy}}|Z_{\theta_{xz}}) + H(Y_{\theta_{zy}}|Y_{\theta_{yx}}) + H(X_{\theta_{xz}}|X_{\theta_{yx}})).$$

Here, $I'_{\theta_{xz}}$ and $I'_{\theta_{zy}}$ represent two lower bound estimations. The final lower bound is thus the bigger value of the two. To understand $I'_{\theta_{xz}}$, note that its first part $(I(X_{\theta_{xz}},Z_{\theta_{xz}})-H(Z_{\theta_{zy}}|Y_{\theta_{xy}}))$ is similar to that of the triangular inequality (Equation 6); but with the different threshold values. The rest part of $I'_{\theta_{xz}}$ characterizes the extra entropy due to the two thresholds for each variable. In the extreme case where the two thresholds on each variable are the same, this term becomes zero and the inequality in turn reduces to Equation 6.

The proof is through recursively applying the inequality 6. Using the same strategy, the upper bound of $I(X_{\theta_{yx}},Y_{\theta_{yx}})$ can be obtained.

Theorem 4 The mutual information of $I(X_{\theta_{yx}},Y_{\theta_{yx}})$ is bounded from above as:

$$I(X_{\theta_{yx}},Y_{\theta_{yx}}) \geq \max(I''_{\theta_{xy}}, I''_{\theta_{xz}}),$$

where $$I''_{\theta_{xz}} = I(X_{\theta_{zy}}, Z_{\theta_{zy}}) - H(Z_{\theta_{xz}}|Y_{\theta_{xz}})$$

$$-(H(Z_{\theta_{xz}}|Z_{\theta_{zy}}) + H(Y_{\theta_{yx}}|Y_{\theta_{zy}}) + H(X_{\theta_{yz}}|X_{\theta_{xz}}))$$

$$I''_{\theta_{xz}} = I(Z_{\theta_{xz}}, Y_{\theta_{xz}}) - H(Z_{\theta_{zy}}|Y_{\theta_{zy}})$$

$$-(H(Z_{\theta_{zy}}|Z_{\theta_{xz}}) + H(Y_{\theta_{yz}}|Y_{\theta_{zy}}) + H(X_{\theta_{yz}}|X_{\theta_{xz}}))$$

Relevance discovery in time series provides a way to understand the relationship among monitored entities. The state of art method for this task is to use the Pearson's correlation and the relevance measure. As we have explained, there are situations where the Pearson's correlation can not reveal the true relevance and the measure is not robust enough for very noisy data.

It is very common for a computer resource metric to exhibit significant behavior change once its metric values exceed or fall below a threshold. However, the absolute metric value may have relatively little observable effect. Inspired by this phenomena, we proposed a measure based on the state transition point model. The measure seeks to find a trade-off between association and effectiveness. The measure is essentially the mutual information of bifurcated time series. The information theoretical measure requires no artificial parameters.

The proposed relevance measure, although fits some problem domains better, is more computationally expensive. So we also propose methods that can speed up the computation. We proposed a estimation method based on using feature vectors obtained from segmenting and aggregating the time series. We also proved there is a special type of triangular inequality that exists for relevance that we can use to avoid pair-wise relevance calculation. The experiments showed our algorithm is significantly faster than the brute force method.

Figure 8:
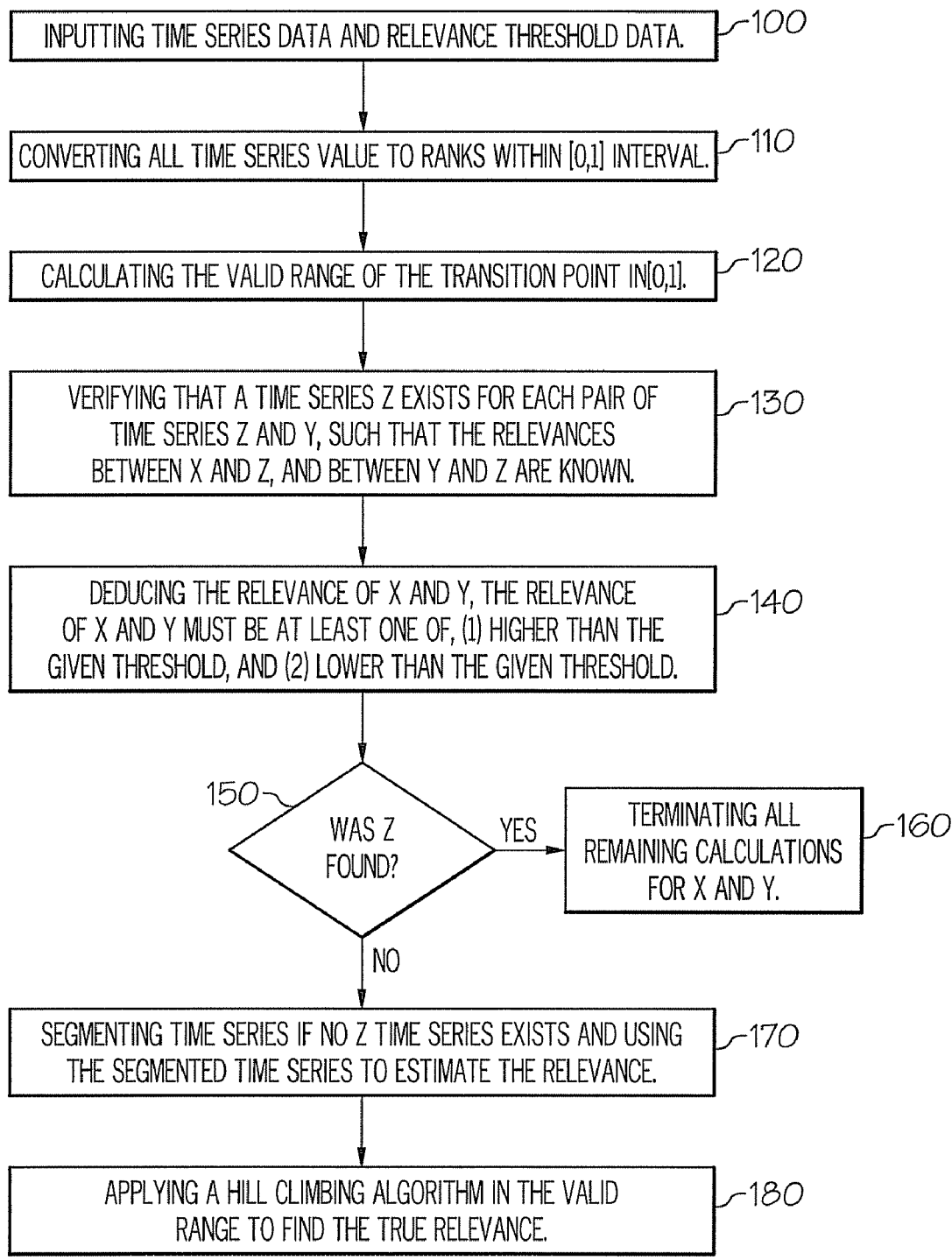
FIG. 8 illustrates an example of a method for measuring time series relevance using state transition points.

Referring to FIG. 8, a method for measuring time series relevance using state transition points is shown. At step 100, all time series data and relevance threshold data are input. Subsequently, at step 110, all time series value are converted to ranks within [0,1] interval.

Then, at step 120, the valid range of the transition point in [0,1] is calculated. At step 130, a verification occurs to determine if a time series Z exists for each pair of time series Z and Y, such that the relevances between X and Z, and between Y and Z are known. Subsequently, at step 140, the relevance of X and Y is deduced. The relevance of X and Y must be either higher than the given threshold, or lower than the given threshold. At step 150 confirmation of Z takes place, provided Z is found, at step 160, terminate all remaining calculations for X and Y.

At step 170, the time series is segmented if no Z time series exists, and then use the segmented time series to estimate the relevance. Then at step 180, a hill climbing algorithm is applied in the valid range to find the true relevance.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for measuring time series relevance using state transition points, comprising:

measuring a computer resource metric to obtain a time series data;

inputting the time series data and relevance threshold data;

converting all time series value to ranks within [0,1] interval;

calculating the valid range of the transition point in [0,1];

verifying that a time series Z exists for each pair of time series Z and Y, such that the relevances between X and Z, and between Y and Z are known;

deducing the relevance of X and Y, the relevance of X and Y must be at least one of, (i) higher than the given threshold, and (ii) lower than the given threshold;

terminating all remaining calculations for X and Y provided Z is found;

segmenting time series if no Z time series exists and using the segmented time series to estimate the relevance;

applying a hill climbing algorithm in the valid range to find the true relevance; and using the true relevance to identify critical resources, the critical resources used for capacity planning.

2. The method of claim 1, wherein for time series with given state transition points, the time series is bifurcated based on the transition point and converted to binary sequences.

3. The method of claim 2, wherein for time series without given state transition points, the relevance is the maximal mutual information for all possible state transition points.

* * * * *